United States Patent [19]

Sugimoto et al.

[11] Patent Number: 4,851,636

[45] Date of Patent: Jul. 25, 1989

[54] METHOD AND APPARATUS FOR GENERATING AN ULTRA LOW CURRENT PLASMA ARC

[75] Inventors: Hisashi Sugimoto; Goro Watanabe, both of Aichi, Japan

[73] Assignee: Kabushi Kaisha Toyota Chuo Kenkyusho, Aichi, Japan

[21] Appl. No.: 95,427

[22] Filed: Sep. 11, 1987

[30] Foreign Application Priority Data

Sep. 22, 1986 [JP] Japan .................... 61-224325

[51] Int. Cl.⁴ .................................. B23K 9/06
[52] U.S. Cl. .................... 219/121.59; 219/137 R; 219/121.55; 219/121.52; 219/121.51; 219/75
[58] Field of Search .................. 219/121 PJ, 121 PK, 219/121 PR, 121 PV, 121 PU, 121 PQ, 121 PT, 121 PW, 74, 75, 137 R; 313/231.31, 231.41, 231.51

[56] References Cited

U.S. PATENT DOCUMENTS

| | | | |
|---|---|---|---|
| 3,809,850 | 5/1974 | Saenger, Jr. ................ | 219/121 PU |
| 4,118,618 | 10/1978 | Gauthier et al. ............. | 219/121 PJ |
| 4,245,768 | 1/1981 | Sater ............................. | 228/116 |
| 4,282,418 | 8/1981 | Wuestner ..................... | 219/121 PJ |

Primary Examiner—M. H. Paschall
Attorney, Agent, or Firm—Oblon, Spivak, McClelland, Maier & Neustadt

[57] ABSTRACT

A method and apparatus for generating a plasma arc used in arc welding, arc transformation hardening, minute working, etc. A plasma gas used for generating a plasma arc includes xenon. A tungsten electrode having a diameter of 0.5 millimeters or less is used. Thus, an extremely low plasma arc current of 0.1 amperes or less can be produced in a stabilized manner.

12 Claims, 5 Drawing Sheets

METHOD AND APPARATUS FOR GENERATING AN ULTRA LOW CURRENT PLASMA ARC

BACKGROUND OF THE INVENTION

1. Field of the Invention

This invention relates to a method and apparatus for generating a plasma arc used for microplasma arc welding, arc transformation hardening of miniature parts, minute working, etc.

2. Description of the Prior Art

In the recent frontier technical fields, miniaturization of various device parts is required and also the development of welding techniques suitable for welding miniature parts having a thickness and a diameter each on the order of microns is desired in the field of welding art.

In order to weld miniature metal workpieces on the order of microns, electron beam welding, laser welding, and microplasma (needle arc) welding are used conventionally. The minimum weldable thickness of a plate-like (foil) workpiece at present is 20 microns (Published Examined Patent Application 3911/1985). The minimum weldable diameter of a wire is about 125 microns (E. F. Gorman et al.: Welding J., No. 11, 1966).

An electron beam welding machine and a laser welding machine are both expensive and difficult to use industrially while a microplasma welding machine is relatively inexpensive as a kind of an arc welding machine and easy to use.

However, the minimum current value available industrially at present to such microplasma arc welding is still 0.1 amperes with which, at most, the edges of lapped stainless steel plates 25 microns thick can only be welded and thinner plates (foils) are difficult to weld.

At present, a method of generating an arc current below 0.1 amperes in a stabilized manner cannot be obtained.

SUMMARY OF THE INVENTION

It is an object of this invention to provide a method of generating a very low plasma arc current below 0.1 amperes in a stabilized manner.

It is another object of this invention to provide an apparatus which generates a very low plasma arc current below 0.1 amperes in a stabilized manner.

A plasma arc generating method according to the present invention comprises the steps of:
supplying a plasma gas comprising a xenon gas or a mixed gas of not less than 50% by volume of xenon and at least one of argon, neon and helium around an electrode of tungsten having a diameter of not more than 0.5 millimeters; and
applying a voltage to the electrode.

A plasma arc generating apparatus as the second invention comprises:
a plasma arc torch means including: a plasma nozzle for ejecting a plasma gas including xenon or a mixed gas of not less than 50% by volume of xenon and at least one of argon, neon and helium; an electrode of tungsten and having a diameter of not more than 0.5 millimeters and disposed within the plasma nozzle; and a shielding nozzle for ejecting a shielding gas surrounding a plasma arc to be produced;
means for supplying a plasma gas to the plasma nozzle;
means for supplying a shielding gas to the shielding nozzle; and
a pilot arc power source and a main power source having a constant current characteristic for applying a voltage to the plasma arc torch.

According to this invention, the atmosphere in which arc is generated includes a gas which is easy to ionize, a so-called low-ionizing voltage gas. The cathode electrode includes a thin tungsten, so that it is easy to emit thermal electrons and generate an arc. A very low plasma arc current not higher than 0.1 amperes can be produced in a stabilized manner.

The above and other objects, features and advantages of the present invention will become more apparent from the following description when taken in conjunction with the accompanying drawings in which a preferred embodiment of the invention is shown by way of illustrative example.

DETAILED DESCRIPTION

Figure 1:
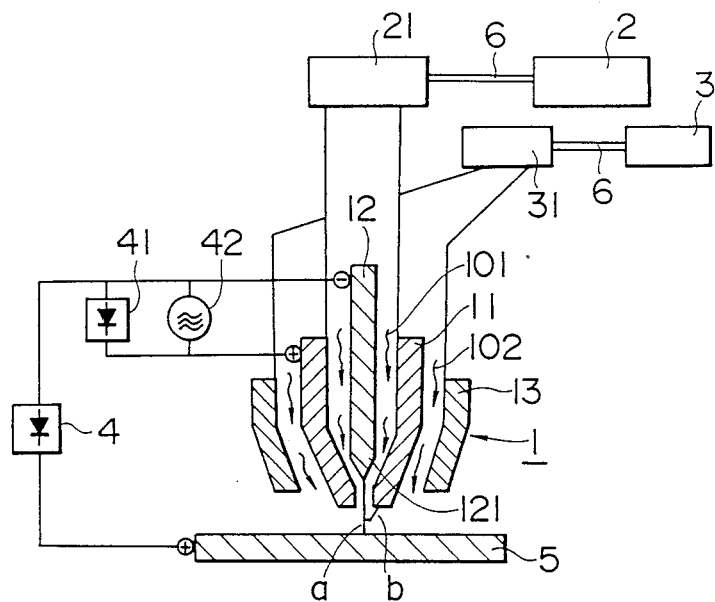
FIG. 1 is a cross-sectional view showing one example of a plasma arc generator according to this invention.

FIG. 1 shows an example of a generator according to this invention which generates a transferred type main arc (plasma arc) a of a current not higher than 0.1 amperes between a plasma arc torch 1 and a material to be welded (a workpiece) 5. The apparatus includes the torch 1 and plasma gas supply means 2, shielding gas supply means 3 and a main power source 4 having a constant current characteristic.

The plasma arc torch 1 includes a plasma nozzle 11 of a conductive material such as copper or copper chromium alloy, a tungsten electrode 12, and a shielding nozzle 13 which surrounds a produced plasma arc (main arc) a with a shielding gas 102. The plasma nozzle is preferably made of a copper alloy and has a diameter of from 0.2 to 1.0 millimeters.

The tungsten electrode 12 may be a conventional electrode made of tungsten and containing 2% of $ThO_2$ or any tungsten electrode available commercially. In this invention, the tungsten electrode should have a diameter of 0.5 millimeters or less. It is difficult for an electrode having a diameter larger than 0.5 millimeters to produce a plasma arc current below 0.1 amperes.

Electrode 12 and plasma nozzle 11 are required to be electrically isolated from and fixed to each other by means of an insulating member, not shown. Shielding nozzle 13 is disposed coaxially with plasma nozzle 11 to ensure that shielding gas 102 surrounds main arc a. Nozzle 13 is made of an insulating material such as ceramics. Plasma nozzle 11 is cooled by a cooling system, not shown, to prevent overheating by arc heat.

Plasma gas supply means 2 includes a high-pressure gas cylinder or a gas supply installation using centralized piping and supplies plasma gas 101 by means of a pipe 6 to a gas regulator 21 which regulates a quantity of gas supplied to plasma nozzle 11. Plasma gas is also supplied to tungsten electrode 12 disposed within plasma nozzle 11 and led to a tip 121 of electrode 12. Like this, it is important to supply a plasma gas to the tip of the tungsten electrode which produces arc.

The shielding gas supply means 3 includes a high-pressure gas cylinder or a gas supply installation using centralized tubing and supplies a shielding gas 102 by means of a pipe 6 to a gas regulator 31 which regulates a quantity of gas supplied to shielding nozzle 13 which can use any type of shielding gas.

The flow rates of the plasma gas and shielding gas vary depending on the diameters of the ejection openings of the plasma nozzle and shielding nozzle. For example, when the plasma nozzle has an internal diameter of 0.5 millimeters, it is preferable that the flow rate of plasma gas is 0.02-0.5 liters/minute and the flow rate of shielding gas is 5-10 liters/minute.

Main power source 4 is connected to a pilot arc power source 41 and a high-frequency generator 42. The secondary minus poles of pilot arc power source 41 and main power source 4 are connected electrically to one output pole of high-frequency generator 42 and tungsten electrode 12 of plasma arc torch 1. The secondary plus pole of pilot arc power source 41 is connected electrically to plasma nozzle 12 together with the other output pole of high-frequency generator 42. The secondary plus pole of main power source 4 is connected to workpiece 5. Pilot arc power source 41, main power source 4 and high-frequency generator 42 are operated by turning on their primary inputs, not shown.

The above structure produces a plasma arc in the following manner.

Plasma gas 101 is supplied from plasma gas supply means 2 to plasma nozzle 11 and also to tungsten electrode 12 within plasma nozzle 11 so as to be led to the tip of electrode 12. The gas is ejected by nozzle 11. Shielding gas 102 is also supplied by shielding gas supply means 3 into shielding nozzle 13 to cause same to eject the gas.

Under such condition, high-frequency generator 42, main power source 4 and pilot arc power source 41 each operate to generate a pilot arc b between plasma nozzle 11 having a hollow structure and tungsten electrode 12. The pilot arc b causes a main arc a between tungsten electrode 12 and a material to be welded (workpiece) 5.

High-frequency generator 42 applies a high voltage as pulses to the tungsten electrode 12. In FIG. 1, the high-frequency generator 42 is provided in parallel with the pilot arc 41, and both are connected to the electrode 12 and the plasma nozzle 11. The high-frequency generator may be omitted or may be provided separately outside the apparatus.

This invention uses as the plasma gas 101 ejected by plasma nozzle 11, xenon having a low ionizing voltage or its mixed gas. A gas mixed with xenon may be one or more of argon, neon and helium gases.

Figure 2:
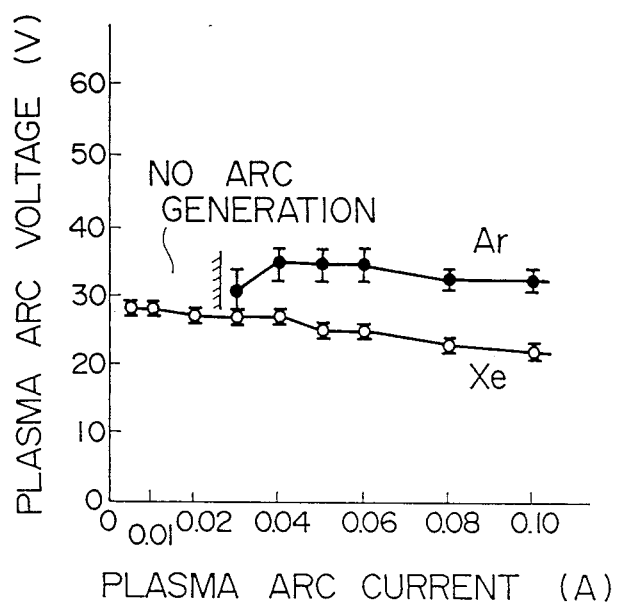
FIG. 2 is a diagram showing the relationship between plasma gas and plasma arc characteristic.
Figure 3:
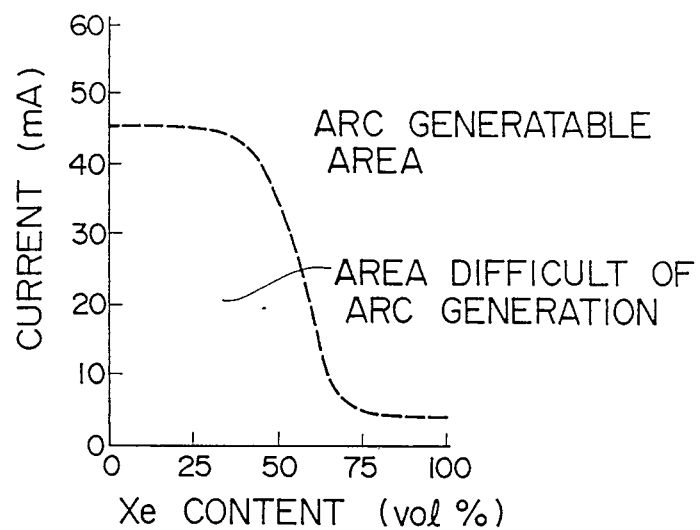
FIG. 3 is a diagram showing the relationship between the mixing ratio of xenon to argon as a plasma gas and a current value which generates a pilot arc.

Part of the plasma gas is ejected from plasma nozzle 101 as a plasma flame, not shown. The arc characteristic within the atmosphere of plasma flame exhibit a substantially constant voltage up to a low current area and generate an extremely low current and a low voltage, as shown in FIG. 2, which shows the characteristics in which a plasma gas of 100% of argon (Ar) and a plasma gas of 100% of xenon (Xe) are used. In this case, the lowest generatable current values vary depending on the composition of the plasma gas used. For example, when the plasma gas includes 100% of argon, as is extensively used in the prior art, the lowest current is 45 milliamperes whereas when the plasma gas includes 100% of xenon having a lower ionizing voltage than argon is used, the lowest current is 5 milliamperes. FIG. 3 shows the relationship between mixture ratio of a mixed gas consisting of argon and xenon and generatable main arc current value. It can be seen from FIG. 3 that the effective reduction of the current value occurs in the range of volume of xenon exceeding 50% by volume.

Miniaturization of the current value of the main arc is achieved by generation of a plasma flame due to pilot arc b, as just described above. The problem is a quantity of heat produced by the plasma flame which should be smaller than that produced by the main arc a. Otherwise, the miniaturization of the main arc a would make no sense. To this end, it is necessary to reduce the current value of pilot arc b itself.

Figure 4:
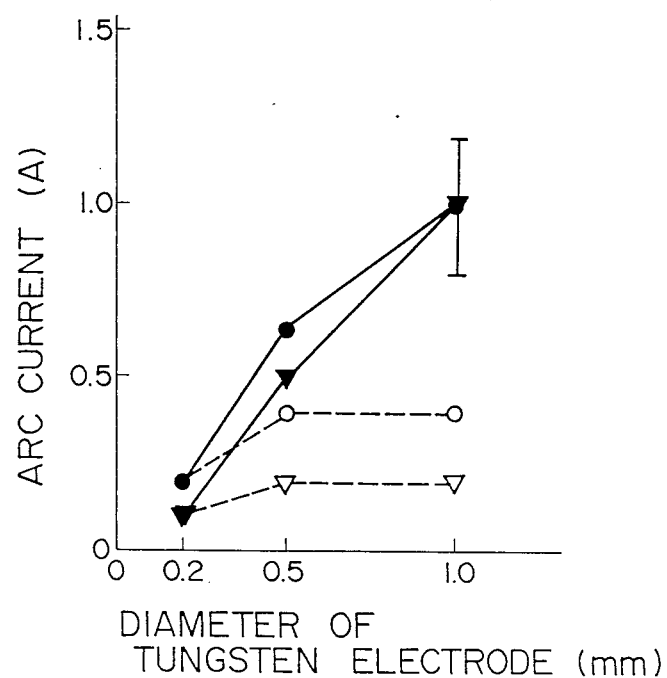
FIG. 4 is a diagram showing the relationship between diameter of tungsten electrode and current value which generates a pilot arc.

In this respect, various tests and studies have clarified that the start-up of pilot arc b and the minimum current for arc holding are greatly influenced by the diameter of tungsten electrode 12 and the kind of plasma gas 101, as shown in FIG. 4.

In FIG. 4, black dots denote the minimum current with which the pilot arc can start when Ar is used, black triangles denote similar current when Xe is used, white circles denote the minimum current for pilot arc holding when Ar is used, and white triangles denote the minimum current for pilot arc holding when Xe is used. When an extremely low current arc is to be used, even an arc start up should be accomplished with a low current. The appearance of the effect has been ascertained by the use of a tungsten electrode having a diameter of 0.5 millimeters or less and the use of xenon or a xenon mixed gas as plasma gas 101.

Figure 5:
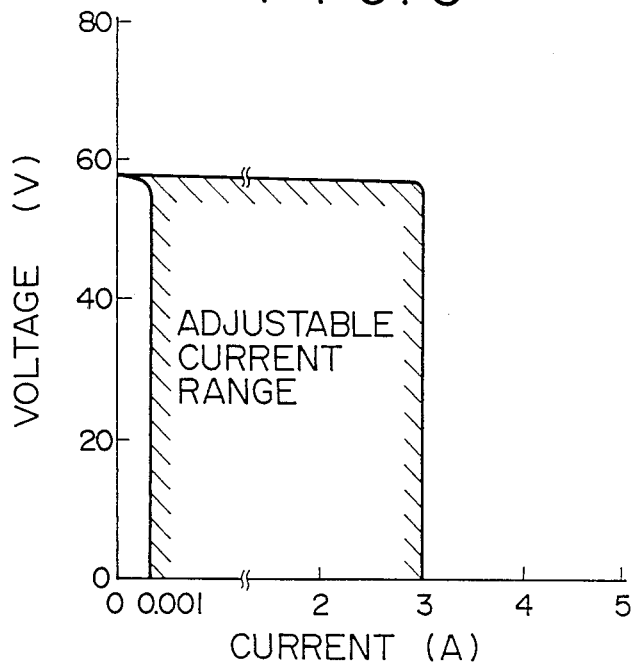
FIG. 5 is a diagram showing the source characteristic suitable for the pilot arc power source and the main power source.

Preferably, main power source 4 should have a constant current characteristic having an open circuit voltage of 50 volts or more and an allowable current range of 0.001-3.0 amperes (FIG. 5). Pilot arc power source 41 should preferably have a constant current characteristic having an open circuit voltage of 50 volts or more and an allowable current range of 0.05-3.0 amperes. The voltage applied to the tungsten electrode should preferably be 20 volts or more.

According to this invention, the above arrangement is capable of forming a low current pilot arc of 0.1-1.0 amperes and an extremely low current plasma arc of 0.001-0.1 amperes.

According to this invention, the minimum current required for generation of a pilot arc is reduced to a value much less than the lower limit of that in the prior art and an extremely low current main arc having a value lower than 0.1 amperes, which has not been produced by the prior art, is generated in a stabilized manner.

This is because the ionization voltage of xenon is low, arc discharge under an atmosphere of a xenon gas or a mixed gas of xenon and an inert gas is easier than under an argon gas in the prior art, and a reduction of the diameter of the tungsten electrode causes an extremely low current arc to easily raise the temperature of the electrode tip, so that thermal emission of electrons is easy and permits the start and holding of an extremely low current arc.

Now, examples of this invention will now be described.

EXAMPLE 1

Two stainless steel foils were welded using the plasma arc generator shown in FIG. 1.

Figure 6:
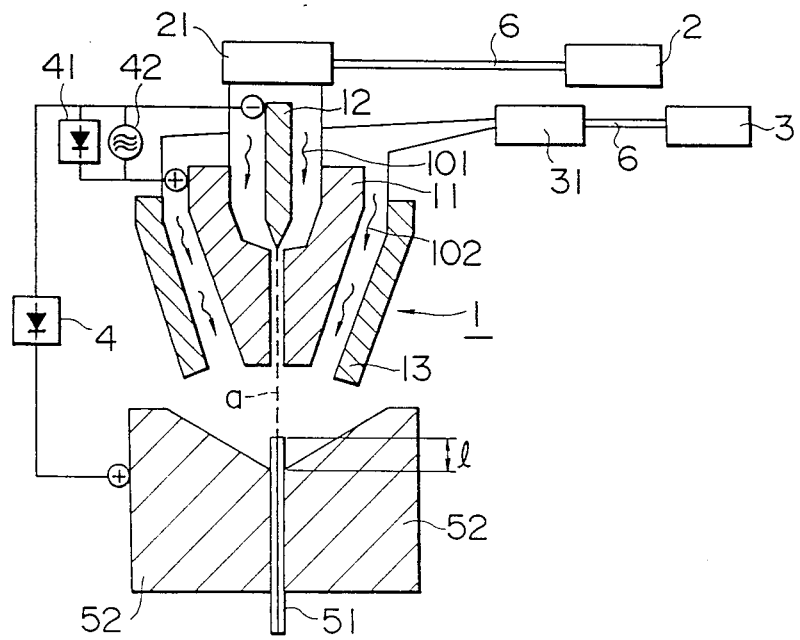
FIG. 6 is a cross-sectional view showing a state of welding in example 1 of this invention.
Figure 7:
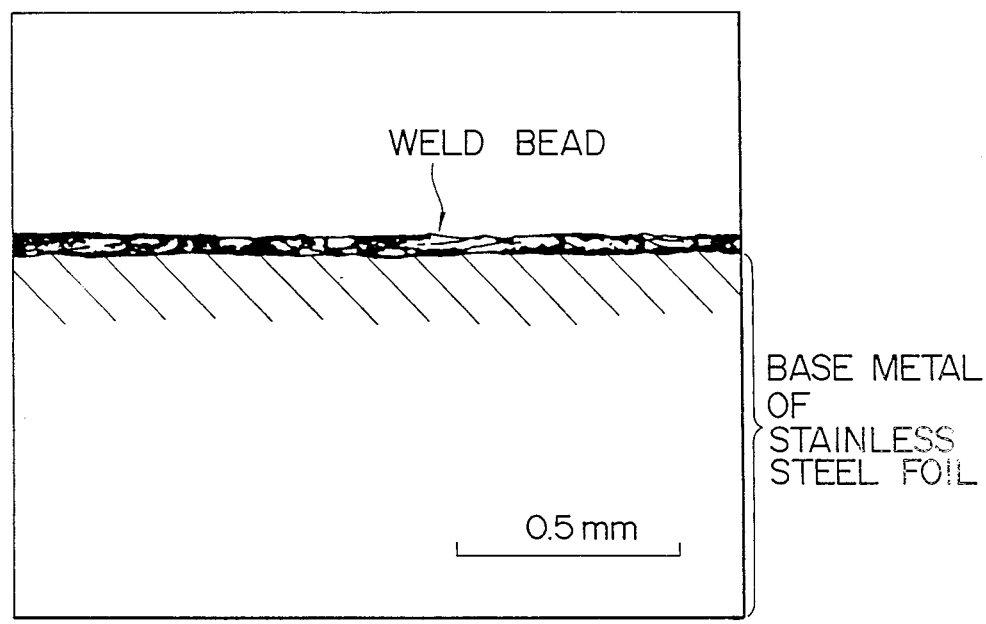
FIG. 7 is a perspective view of a weld of stainless steel foils in example 1.

As workpieces, two SUS 304 stainless steel foils 51 were used. As shown in FIG. 6, two lapped stainless foils were fixed by a pair of copper hold members 52 with a protrusion l=0.5 millimeters. Thus gas cylinders were used as plasma gas supply means 2 and shielding gas supply means 3 (this applies to the subsequent examples). As plasma gas 101, a quantity of 100% of xenon was supplied at a flow rate of 0.05 liters/minute; the tungsten electrode 12 was 0.2 millimeters in diameter and contained 2% of $ThO_2$; shielding gas 102 used consisting of argon and 7% of hydrogen was supplied at a flow rate of 6 liters/min. Welding was performed at 0.35 amperes of pilot arc current, 50 milliamperes of main arc current and 10 centimeters/minute of welding rate. As a result, as shown in FIG. 7, a very excellent bead-like weld was formed.

EXAMPLE 2

Two Nichrome wires were welded using the plasma arc generator shown in FIG. 1.

Figure 8:
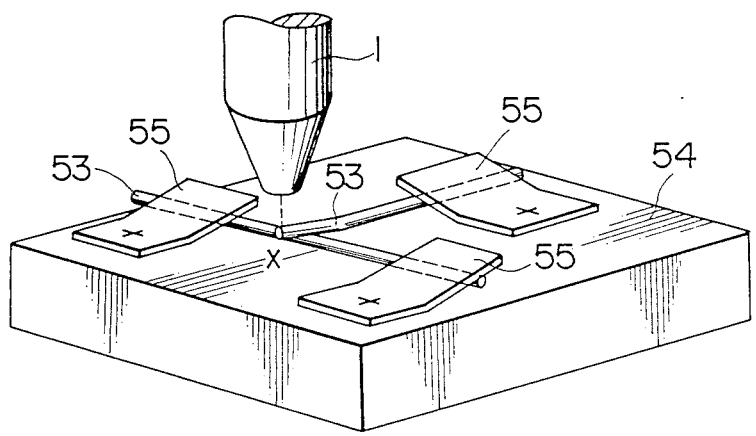
FIG. 8 is a perspective view showing a welding state of example 2.
Figure 9:
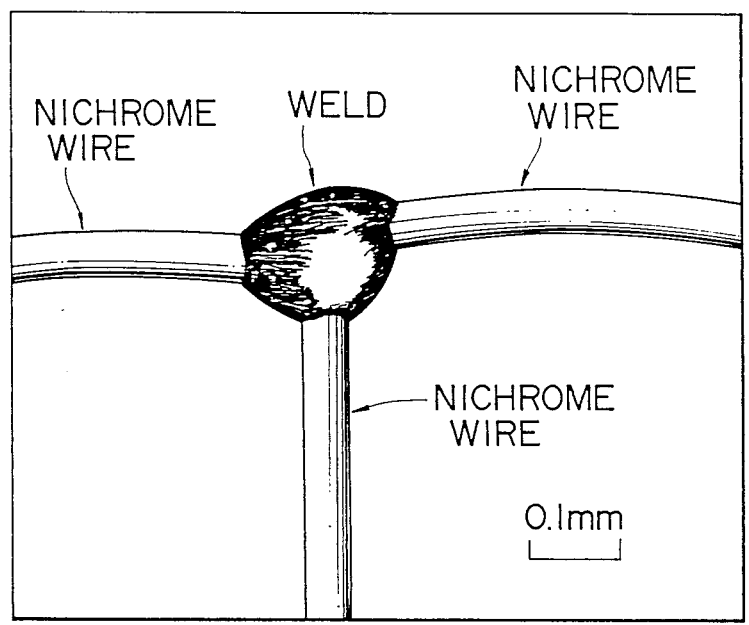
FIG. 9 is a perspective view of a weld of Nichrome wires in example 2.

As shown in FIG. 8, plasma arc was applied to an intersection x where two Nichrome wires 53 having a diameter of 50 microns were disposed in contact with each other to form a T on a heat sink of copper plate 54 and held by press members 55. A quantity of 100% of xenon as the plasma gas was supplied at a flow rate of 0.05 liters/minute, a tungsten electrode 12 having a diameter of 0.2 millimeters and containing 2% of $ThO_2$ was used, argon containing 7% of hydrogen as the shield gas was supplied at a flow rate of 6 liters/minute. Welding was performed at 0.35 amperes of pilot arc current and 30 milliamperes of main arc current for 4 seconds of arc time. As a result, an excellent T-like weld was formed as shown in FIG. 9.

REFERENCE EXAMPLE 1

Figure 10:
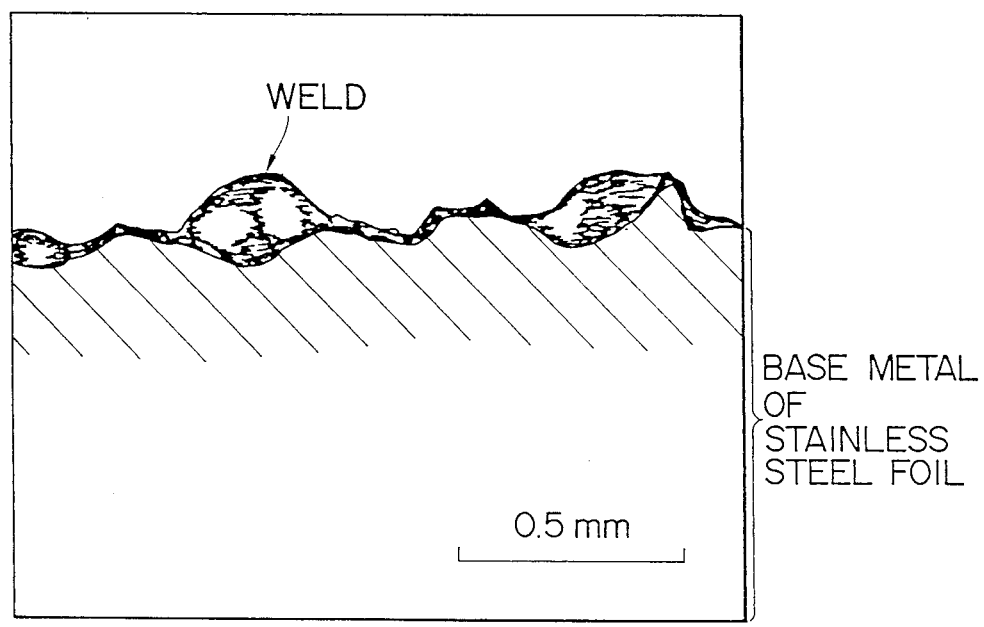
FIG. 10 is a perspective view of a weld of stainless foils in a reference example 1.

Two lapped 5-microns thick SUS 304 stainless steel foils were welded in a manner similar to that of Example 1 except at welding conditions in which 100% of argon as the plasma gas was supplied at a flow rate of 0.2 liters/minute, a tungsten electrode having a diameter of 1.0 millimeters and containing 2% of $ThO_2$ was used, the pilot arc current was 1.9 amperes, the main arc current was 90 milliamperes, the welding speed was 20 centimeters/minute. As a result, a melt down weld shown in FIG. 10 was obtained.

REFERENCE EXAMPLE 2

The T-like welding of two Nichrome wires having a diameter of 50 microns was performed in a manner similar to that of Reference Example 1 except that the pilot arc current was 0.6 amperes. As a result, the Nichrome wires were fused away instantaneously after the occurrence of the main arc and could not be welded.

What is claimed is:

1. A method for generating a plasma arc, comprising:
supplying a plasma gas comprising a xenon gas or a mixed gas containing not less than 50% by volume of xenon and at least one member selected from the group consisting of argon, neon and helium, around a tungsten electrode having a diameter of not more than 0.5 mm; and
applying a voltage between said electrode and an electrically conductive plasma nozzle and between said electrode and a workpiece to generate said plasma arc.

2. The method of claim 1, comprising supplying a shielding gas for surrounding the plasma arc to be produced.

3. The method of claim 1, comprising using a flow rate of plasma gas of from 0.02 to 0.5 liters per minute.

4. The method of claim 1, wherein the voltage applied is not less than 20 volts.

5. An apparatus for generating a plasma arc, comprising:
an electrically conductive plasma arc torch means including: a plasma nozzle for ejecting an electrically conductive plasma gas comprising xenon or a mixed gas containing not less than 50% by volume of xenon and at least one member selected from the group consisting of argon, neon and helium; a tungsten electrode having at the maximum diameter point a diameter of not more than 0.5 mm and disposed within said plasma nozzle; and a shielding nozzle for ejecting a shielding gas surrounding a plasma arc produced;
means for supplying a plasma gas to said plasma nozzle;
means for supplying a shielding gas to said shielding nozzle; and
a pilot arc power source connected between said electrode and said plasma nozzle and a main power source connected between said electrode and a workpiece, each source having a constant current characteristic.

6. The apparatus of claim 5, further comprising a high-frequency generator connected between said electrode and said plasma nozzle, for applying a high voltage across said electrode and said plasma nozzle.

7. The apparatus of claim 5, wherein said main power source has the constant current characteristic in which an open circuit voltage is not less than 50 volts, and the range of current adjustment is between 0.001 and 2.0 amperes.

8. The apparatus of claim 5, wherein said pilot arc power source has the constant current characteristics in which an open circuit voltage is not less than 50 volts and the range of current adjustment is between 0.05 and 3.0 amperes.

9. The apparatus of claim 5, wherein said electrode is made of tungsten containing 2% $ThO_2$.

10. The apparatus of claim 5, wherein said plasma nozzle is made of a copper alloy having an internal nozzle diameter of from 0.2 to 1.0 mm.

11. The apparatus of claim 5, wherein said plasma nozzle is connected to a cooling system.

12. An apparatus for generating a plasma arc, comprising:
a plasma arc torch means including: an electrically conductive plasma nozzle for ejecting a plasma gas comprising xenon or a mixed gas containing not less than 50% by volume of xenon and at least one member selected from the group consisting of argon, neon and helium; a tungsten electrode having at the maximum diameter point a diameter of not more than 0.2 mm and disposed within said plasma nozzle; and a shielding nozzle for ejecting a shielding gas surrounding a plasma arc produced;

means for supplying a plasma gas to said plasma nozzle;

means for supplying a shielding gas to said shielding nozzle; and a pilot arc power source connected between said electrode and said plasma nozzle and a main power source connected between said electrode and a workpiece, each source having a constant current characteristic.

* * * * *